United States Patent [19]

Clement

[11] 4,418,526

[45] Dec. 6, 1983

[54] CHAIN COUPLING OR LOCKING LINK

[75] Inventor: Anton Clement, Iserlohn-Letmathe, Fed. Rep. of Germany

[73] Assignee: August Thiele, Iserlohn-Kalthof, Fed. Rep. of Germany

[21] Appl. No.: 348,459

[22] Filed: Feb. 12, 1982

[30] Foreign Application Priority Data

Feb. 19, 1981 [DE] Fed. Rep. of Germany ... 8104620[U]

[51] Int. Cl.³ .......................................... F16G 15/04
[52] U.S. Cl. ...................................................... 59/85
[58] Field of Search ........................ 59/85, 86, 93, 78

[56] References Cited

U.S. PATENT DOCUMENTS 859,082  7/1907  Kenter ................................... 59/85

FOREIGN PATENT DOCUMENTS 1196028  7/1965  Fed. Rep. of Germany .......... 59/85
1226839 10/1966  Fed. Rep. of Germany .......... 59/85
2200381  5/1973  Fed. Rep. of Germany .......... 59/85
2813748 10/1979  Fed. Rep. of Germany .......... 59/85

6405203 11/1964  Netherlands ........................... 59/85

*Primary Examiner*—Gene Crosby
*Attorney, Agent, or Firm*—Michael J. Striker

[57] ABSTRACT

A chain coupler link or a chain lock made preferably of round steel is assembled of two complementary J- or U-shaped link halves each having two arms of different lengths. The ends of respective arms are formed with interlockable tongue-and-groove joints and the facing wall portions of the longer arms are formed with arresting grooves directed transversely to the center plane of symmetry of the link. An arresting nose piece is insertable between the wall portions so that the projecting noses engage with respective arresting recesses. A sloping bore passes through the link halves and through the arresting piece to receive a safety pin. To ensure an unobstructed insertion of the safety pin into the sloping bore, the noses and the corresponding arresting recesses have different cross sections, so that the arresting pin is insertable between the link halves in a single orientation only.

3 Claims, 3 Drawing Figures

CHAIN COUPLING OR LOCKING LINK

BACKGROUND OF THE INVENTION

This invention relates in general to chain coupler links or chain locks, particularly for heavy-duty round steel chains used in underground mining, for instance. The chain link of this invention is of the type which comprises a pair of complementary J-shaped link halves each defining two arms of different lengths and provided at its end with interlockable tongue-and-groove joints and with a spacer piece insertable between the interlocked halves and being provided with projecting noses engageable with arresting recesses formed in the facing wall portions of the longer arms.

In assembling chain coupler links according to the German Standard 22 258 by means of the interposed nose piece, an improper insertion of the nose piece is possible inasmuch as the twin projecting noses of the spacer piece and the corresponding transverse grooves on the two link halves of the chain coupler have the same cross section. This construction permits the insertion of the nose piece in the assigned arresting grooves on the link halves in either of its two possible positions; nevertheless, difficulties may arise when a safety pin is to be driven into an inclined bore passing through the two link halves and the nose piece, because the safety pin can be inserted only in a predetermined position of the link. In machining the inclined bore in the link parts minute manufacturing tolerances cannot be avoided, and consequently in the case of an improper insertion of the nose piece between the interlocked link halves a minute overlap of the edges of the bore section will occur. Consequently, this misalignment leads to difficulties in driving the safety pin into the bore.

To avoid this difficulty, the conventional chain links of this kind have employed markings such as center punch marks at suitable points to indicate which nose belongs to a particular transverse groove. Such punch marks, however, are frequently overlooked or their interrelationship is not recognized, particularly under impaired visibility in the dusty environment of mines.

SUMMARY OF THE INVENTION

It is therefore a general object of the present invention to overcome the aforementioned disadvantages.

More particularly, it is an object of the invention to provide an improved chain coupler link which permits an unambiguous installation of the holding nose piece without the necessity to employ additional markings.

In keeping with these objects, and others which will become apparent hereafter, one feature of the invention resides, in a chain coupler link of the aforedescribed type, in the provision of an arresting nose piece in which the projecting noses and the corresponding recesses in the link halves have different cross section to permit the insertion of the arresting piece between the halves in a single predetermined position only. Preferably, one of the two arresting noses and its corresponding recess has broader cross section when viewed in the major center plane of symmetry of the link than the other nose and recess. In a modification, one of the noses has at its unloaded end portion a wedge-like or rounded configuration.

By virtue of this invention, the nose piece can be without difficulties inserted only in a single correct position between the two link halves, and the safety pin is smoothly insertable into the properly aligned sloping bore between the link parts.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
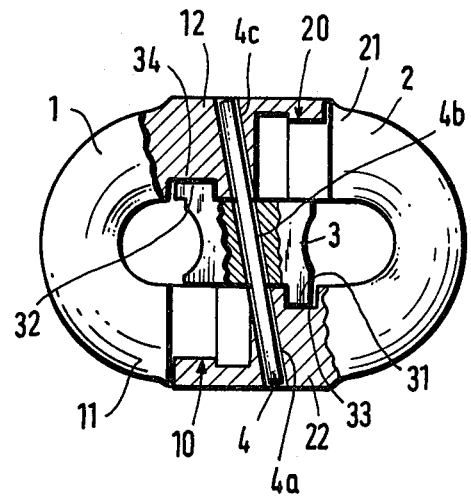
FIG. 1 is a side view, partly in section, of one embodiment of a chain coupler link or chain lock with an interchangeable nose piece.

Referring to FIG. 1, the depicted chain lock or chain coupler link consists of two J-shaped identical link halves 1 and 2 each having two arms 11 and 21 or 12 and 22 of different lengths and complementing each other into the oval shape of the link. The facing end portions of the arms are formed with tongue-and-groove joints 10 and 20 interlockable with each other in parallel planes. The inwardly facing wall portions of the longer arms 12 and 22 are formed with an arresting recess 33 or 34 for receiving noses 31 and 32 of a nose piece 3 which is shaped to be inserted into the center part of the elongated opening between the interlocked link arms 11, 12, 21 and 22 so that the noses 31 and 32 by engaging the arresting grooves 34 and 33 prevent the links from disengagement.

The nose piece 3 has an approximately Z-shaped configuration and the noses 31 and 32 are formed at diametrically opposed corners of the piece T to fit into the correspondingly shaped transversely directed arresting grooves 33 and 34 in the link halves 1 and 2. The arresting nose piece is inserted into its position transversely to the major central plane of symmetry of the interlocked link halves.

Safety pin 4, which is normally in the form of a strong clamp pin, is pressed into the inclined bore constituted by three aligned bore sections 4a, 4b and 4c formed respectively in the link halves 1 and 2 and in the intermediate nose piece 3. In order to enable trouble-free insertion into the consecutively arranged bore sections 4a–4c, the nose 32 and its corresponding arresting groove 34 have a cross section which is different from the opposite nose 31 and its arresting groove 33. In this manner, the nose piece 3 can be inserted between the link halves 1 and 2 in a single predetermined position in which the individual sections of the safety bore are accurately aligned with each other.

Figure 2:
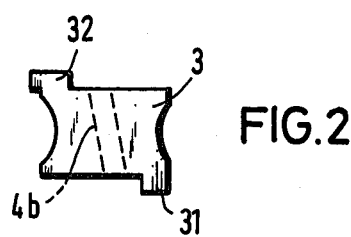
FIG. 2 is a side view of the nose piece of FIG. 1.
Figure 3:
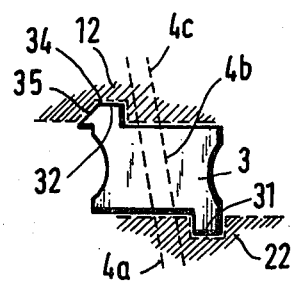
FIG. 3 is a side view of a modified version of the nose piece of FIG. 2.

In the embodiment according to FIGS. 1 and 2, the nose 32 and its corresponding arresting groove 34 have a rectangular cross section, whereby the nose 32 of larger cross section overhangs the lateral side of the arresting piece in longitudinal direction of the link. In the embodiment according to FIG. 3, the overhanging part of the nose 32, which is directed to the pressure-relieved side of the link, and the corresponding arresting groove 34 have a sloping configuration to facilitate the insertion of the nose piece.

In still another modification, the overhanging part of the larger nose 32 and the corresponding portion of the arresting groove 34 can be rounded, whereas the smaller opposite nose 31 and its groove 33 have the rectangular shape of smaller cross section.

It will be understood that each of the elements described above, or two or more together, may also find a useful application in other types of constructions differing from the types described above.

While the invention has been illustrated and described as embodied in a round steel chain link, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A chain coupling or locking link, particularly for use in heavy-duty round steel chains, comprising a pair of complementary J-shaped link halves each defining two arms of different lengths, interlockable tongue-and-groove joints formed at facing end portions of said halves, and an arresting recess formed transversely to the major center plane of symmetry of the link in the inner wall portion of the longer arms; an arresting piece insertable between said wall portions and having projecting noses engageable with the respective arresting recesses to prevent said halves from shifting; an inclined bore passing through the opposite halves and said arresting piece for receiving a safety pin; said noses and the corresponding arresting recesses having different cross sections when viewed in the major plane of symmetry of the link to permit the insertion of said arresting piece between said halves in a predetermined orientation only.

2. A chain coupling or locking link as defined in claim 1, wherein the nose of larger cross section overhangs the adjoining sides of the arresting piece.

3. A chain coupling or locking link as defined in claim 1, wherein the nose of larger cross section and the corresponding arresting groove in said link halves has a sloping projecting surface.

* * * * *